May 20, 1958     J. D'A. CLARK     2,835,622
COMPOSITE MOLDED BOARD AND METHOD OF MANUFACTURE
Original Filed Feb. 23, 1951
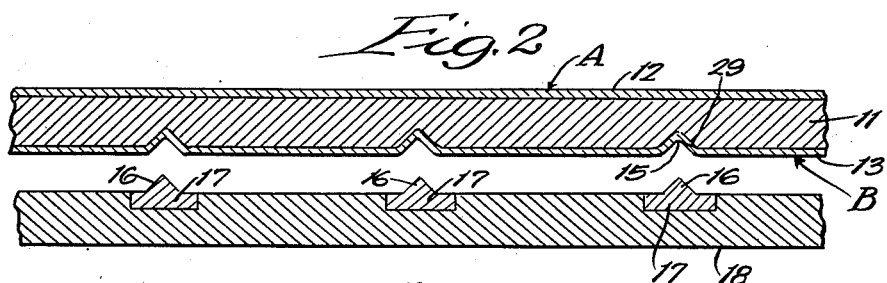
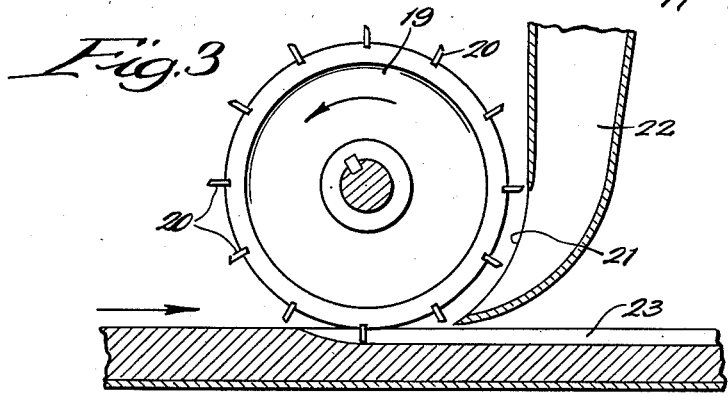
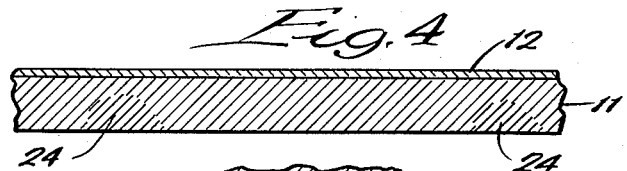
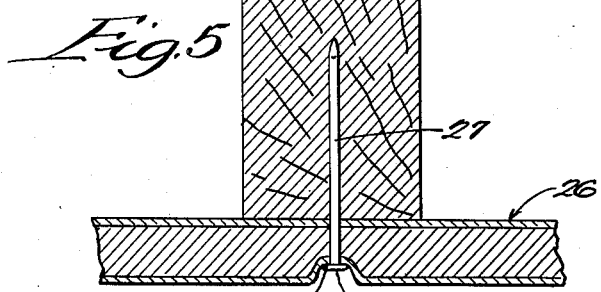
INVENTOR:
James d'A. Clark,
BY
Dawson & Ooms,
ATTORNEYS.

United States Patent Office 2,835,622
Patented May 20, 1958

2,835,622

COMPOSITE MOLDED BOARD AND METHOD OF MANUFACTURE

James d'A. Clark, Longview, Wash., assignor to Changewood Corporation, Chicago, Ill., a corporation of Illinois Continuation of abandoned application Serial No. 212,233, February 23, 1951. This application December 8, 1954, Serial No. 473,917

13 Claims. (Cl. 154—110)

This invention relates to boards molded from woody material and it relates more particularly to structural board and the like prepared from woody particles molded under heat and pressure and provided with modified surface layers for flame-proofing or for decorative purposes.

This application is a continuation of my copending application, Serial No. 212,233, filed February 23, 1951, now abandoned.

In my application Serial No. 192,284, filed October 26, 1950, copending with the aforementioned patent application, and now abandoned, description is given of the preparation of a novel form of woody particles which have been found suitable, when mixed with a small amount of thermosetting resinous material, for dry process molding under heat and pressure into a smooth surfaced, high strength integrated board. A board of the type described is generally formed under pressure with less than 25 percent of moisture and is characterized by an unusually low expansion or contraction, either in width or in length, in response to a change in moisture content. Expansion and contraction which does occur, corresponds generally to the amount which takes place along the grain of the individual woody particle—about ⅕ of 1 percent when the relative humidity is changed from 25 to 90 percent, which is only one-third or less of that of board prepared by presently known wet or moist processes.

In consequence, dry process boards of the type described are particularly well adapted for use as wall board, structural board, or other board products where a low expansion and contraction in width and length is desirable in order to maintain a close fit between the joints of adjacent members. When fabricated with a thickness of one-quarter inch or more, a board of the type described will have sufficient sterngth to permit nailing or otherwise fixing directly onto studding or other framework of a building structure to form the inner wall of a room without the necessity for first constructing a sub-wall. In localities where flame-proofness of the wall members is a prerequisite, it is easily possible to incorporate a fire resisting layer, comprising asbestos, glass, other mineral fibers or flame retarding materials with a suitable binder on the inner face of the board.

It is usually desirable to provide the exposed or outer face of the board with a particular composition such as paper, textile, wood veneer, flakes, mineral particles, metal sheeting or other figured or decorative material integrated with the board to become a permanent part thereof. By such means, hardness, smoothness, color, design, sheen and other desirable properties may readily and effectively be incorporated into one face of the board proper coincident with or after manufacture of the core board by molding, while the opposite face is left with its natural finish or is fireproofed or otherwise treated.

Inherent in unbalanced structures of the type described is warpage, which has often led to their being unacceptable for the use for which they were intended. This warpage is difficult to overcome and means to obviate it have not heretofore been made available. Warapge inevitably occurs in board of the type described when one or both faces are dissimilar to the molded core or the faces are dissimilar to each other. This is believed to be caused chiefly by differences in thermo-expansibility or differences in the effect of absorption or loss of moisture in the outer strata of the board structure. Warpage of the type described usually occurs incident to cooling after the molding cycle or soon thereafter. Elimination of such warping influences have not heretofore been consistently achieved and, as a result, the industry has had to content itself with the realization that it has been practically impossible to produce a board of the type described having an unbalanced construction and which will remain substantially flat, notwithstanding changes in the ambient atmospheric conditions.

An object of this invention is to provide an improved dry molded board fabricated chiefly of woody fibers or the like and having an unbalanced construction.

Another object is to provide a board molded of discrete particles of woody material with one face having a different composition than the other and which is and remains substantially flat under normal changes of atmospheric conditions.

A further object is to provide a dimensionally stable board which remains substantially flat under all normal exposures and which may be provided with a decorative face on one side and a flame-proof face on the other and a related object is to provide a method for manufacturing same.

Other objects and advantages of this invention will be apparent from the following description, in which:

Figure 1 is a fragmentary sectional elevational view of a board embodying features of this invention;

Figure 2 is a sectional elevational view illustrating a modification in the board shown in Figure 1 accompanied with apparatus for effecting same;

Figure 3 is a diagrammatic view partially in section of apparatus for achieving the modification in a board structure of the type shown in Figure 2;

Figure 4 is a sectional elevation view of a modification in a board structure embodying features of this invention, and Figure 5 is a sectional elevational view showing the board structure of Figure 2 secured in position of use.

I have achieved the manufacture of a molded board of unbalanced construction and attained the objects of this invention by first recognizing the causes for the warping and providing means for overcoming, compensating or eliminating the reactions or conditions which have led to warping while also selectively incorporating elements to impart desired properties to the surface as an integral part of the assembly.

I have found that the sensitivity and the magnitude of expansion and contraction responsive to moisture or temperature change is greater for boards having higher density especially in the range upwards of 0.9 gram per cubic centimeter. In order to minimize shrinkage or expansion with consequent elimination of warpage in the molded product, I propose to make unbalanced boards with as low a density as possible commensurate with the strength and hardness desired. The modulus of rupture is markedly affected by decrease in density but it is possible to partially compensate therefor by a corresponding increase in the board thickness. For instance, in the dry molding process described in my copending application Serial No. 110,212, filed August 13, 1949, for the manufacture of board, the modulus of rupture decreases in proportion to the 3.5 power of its density but as with all boards, the resistance to fracture upon flexure increases in proportion to the square of their thickness. In the practice of this invention optimum properties are secured in a board having a density in the range of 0.9 to 0.6 with proportionate increase in thickness, as compared with a thinner board having the usual greater density of over 0.9 and a much higher modulus of rupture. For example, in one experiment, a series of boards made of woody particles having the same characteristics and mixed with 2 percent by weight of finely powdered phenol formaldehyde B stage resin and molded under various pressures at 310° F. gave the following breaking loads at the center of a 1½ inch strip on a 4 inch span:

| Press Pressure, lbs. | Average Thickness, Inches | Average Density, g./cc. | Average Force, lbs. | Average Modulus of Rupture, p. s. i. |
|---|---|---|---|---|
| 52 | .44 | .48 | 39 | 800 |
| 75 | .40 | .53 | 54 | 1,350 |
| 100 | .36 | .60 | 67 | 2,050 |
| 200 | .30 | .71 | 68 | 3,100 |
| 415 | .26 | .90 | 75 | 5,300 |
| 720 | .21 | 1.06 | 76 | 6,800 |

It will be evident that practically the full potential resistance of the board to a flexure breaking force is realized within the preferred range heretofore described.

I have also found that, upon cooling, the face of the board that has been disposed adjacent the hottest of a pair of molding surfaces or platens will become concave while the opposite or colder face becomes convex. This phenomenon is believed to result directly from the fact that the coefficient of thermal expansion and contraction of a woody material and binder is relatively high and the portion of the flat molded board which is at higher temperature upon completion of the molding process will cool through a greater temperature range. The hottest side will, therefore, experience greater shrinkage than adjacent or the opposite strata of the molded product. Such unequal shrinkage inevitably causes warpage to follow.

I have also found that the initial moisture in a face of the material before molding, bears considerable influence on the subsequent warpage of the molded product. For example, in a homogeneous mass of such fibrous materials which are molded between platens having uniform temperature, with one outer strata having less moisture therein than the other, the side having initially the greater moisture content will become concave. This is believed to result from a combination of factors wherein the strata with the greater moisture content will be more plastic and thus will be compressed to a higher density than the adjacent strata with less moisture. The strata with the higher density will shrink more on cooling after molding with consequent warpage of the board.

Substantially the same effect arises when, instead of variation in moisture, there is a non-uniform concentration of binder or other resinous material within strata of the fibrous elements. Higher resinous concentration results in greater density of that strata under identical molding conditions. Also, when one platen has a higher temperature than the other, greater fluidity is imparted to the resinous binder and to the plasticity of the woody material, especially if damp, so that greater density is achieved in the adjacent strata of the molded product.

I have found that, in general, the use of asbestos or other mineral fibers as a fire-proofing element integrated with the same percentage of a resinous material onto one side of the board provides a surface that has less tendency to shrink on cooling than adjacent woody portions. As a result, the flame-proofed layer 12 laminated onto the molded base portion 11 will tend to form a convex surface. This condition will be further aggravated when the opposite side is coated or impregnated with a resinous containing layer 14 or other decorative sheet having a high resin or moisture content when pressed.

In accordance with the practice of this invention, the factors which cause warpage of a board with an unbalanced construction and thus the production of an undesirable board, are substantially overcome by specific molding techniques. One condition employed in the practice of this invention is to maintain a low consolidating pressure so that the density of the board will be as low as can be tolerated consistent with the lower strength and greater water absorbency characteristics. Another condition which leads to improvement in the product resides in keeping the molded boards flat and hot after molding to allow some release of internal stresses by plastic flow. Although some improvement results from such modifications, complete elimination of warpage in boards of unbalanced construction so as consistently to produce relatively flat uniform products has not been achieved.

To produce molded boards of unbalanced construction consistently having relatively flat surfaces, it has been found expedient, in accordance with this invention, to employ one or more specific techniques to compensate for the natural tendency of the board to warp by selectively increasing or decreasing the normal shrinkage in predetermined strata of the board. If board made without reference to this invention warps after fabrication to make side A convex, the steps to be taken include the use of a platen at higher temperature adjacent the surface A which means, because of other reasons heretofore described, increase the shrinkage of the adjacent side.

Another means is to incorporate higher moisture content in the strata on the A side than in the B side before pressing. A still further means is to employ a higher concentration of resinous material or the like on the outer strata on the A side as compared to that on the B side. Other possible means may reside in changing the types of resin binders on the opposite sides and in extreme cases, employing platens of suitable contour as will be discussed later. It will be understood that more than one of the above means may be carried out at one and the same time and that modification of the opposite side strata (B) may be conversely treated so as to reduce the expected shrinkage thereof, such as by lessening the moisture content relative to the opposite side A, by decreasing the resinous concentration as compared to the A side or by reducing the tempemature of the press platen on the B side as compared to that on the A side. In the event that one or more surface layers 12 or 14 are employed, the resin or moisture content therein may be similarly regulated to impart the desired influence on shrinkage.

When one of the outer layers 12 or 14, laminated to the molded fibrous core 11, comprises a sheet of paper, wood veneer or other anisotropic material having a marked unidirectional strength, it is possible to eliminate warpage entirely in one principal direction, but the board tends to acquire a curvilinear shape at right angles to this direction, along or across the grain of the veneer or paper. In the parctice of this invention, warpage along the grain may be corrected by the steps previously described and warpage across the garin may be minimized by forming a series of grooves 15 parallel to the direction of the grain of the material laminated to the surface so as to provide increased flexibility in the cross grain direction. Where such a grooved surface constitutes the exposed surface of the board, the spacing and contour of the grooves may be arranged to appear as planking or other decorative structure.

Grooves of the type described may be formed in the consolidated board by conventional cutting means, such as with a saw or other grooving tool, but their formation may be fore conveniently and more economically accomplished by molding the grooves into the surface of the board coincident with the molding operation for consolidating the dry chips or fibrous particles under heat and pressure. For this purpose, rib elements 16 extending from inserts 17 may be anchored to channel sections formed in the molding surface of the platen 18 so as to form part of the molding surface. When such technique is employed, excessive density in the groove portion is avoided by first removing material from the corresponding portion of the molding compound.

As shown in Figure 3, molding material can be removed from the surface portion of the mat wherein grooves are to be formed by means of a rapidly rotating saw-like wheel 19 having a plurality of teeth 20 arranged about the periphery thereof to fling fibrous particles 21 into the mouth of a suction tube 22 as the fibrous mat is advanced in one direction beneath several such wheel members arranged in predetermined laterally spaced relation. Instead of moving the fibrous mat in one direction relative to the wheels, the mat may be held stationary while the wheel members are moved over the surface thereof to remove fibrous particles so as to form the furrows in which are subsequently formed grooves 23.

Alternatively, during felting, the fibrous elements may be diverted from lineal zones by covering up a corresponding strip-like area on the underside of the felting head with a finger or cover plate as described in my copending application Serial No. 61,674, filed on November 23, 1948. A further technique which I have found suitable to provide grooves of less fiber concentration is to arrange stationary vertical strips of metal, plastic or the like corresponding to the desired position of the groove immediately above the surface upon which the fibrous elements are being deposited. The strips should be designed to have a depth substantially similar to that of the felted web. By this means, the strips will divert fibrous material to either side thereby to prevent an interlocking of the fibrous elements across its thickness so that lineal zones of lower density corresponding to the positions of the strips during felting will be formed in the consolidated structure.

By way of further modification, a facing sheet of fabric, paper, plastic, wood veneer or the like, may be positioned over the face of the furrowed core 11 prior to molding so that the material in the areas of the facing sheet or fabric corresponding to the furrowed portion may be forced down into the furrow and conform with the ribbed contour of the molding surface. Optimum results are secured when the quantity of material removed, if consolidated, would represent the amount of space occupied by the extending rib portion so that the grooved portion will have a density which does not differ substantially from the remainder of the molded structure.

Where grooves are undesirable in the finished board, improved results are secured when furrows or less dense zones of the type described are formed in the molding material but with molding operations carried out between flat surfaced platens so that the finished board will have considerably less density or even be devoid of material in the areas along which the furrows existed, as indicated by the numeral 24 in Figure 4. The lower density of such spaced apart line portions provides for greater flexibility of the board so as to minimize the effect of warpage in the cross direction.

Although substantial elimination of warping of a board with an unbalanced construction constitutes the chief object achieved by the grooving technique described, other important advantages are derived. For example, the grooved members 25 in the final board product 26 provide convenient recesses in which fastening means, such as screws or T-headed nails 27 might be concealed, as shown in Figure 5. Also, if one face of the composite board is of metal or thick plastic, the warpage of which cannot be corrected by the means disclosed (except for contoured platens), recourse may be made to grooving the boards both lengthwise and crosswise.

By way of example, a board may be molded of woody particles consolidated dry under heat and pressure with about 2 percent by weight of phenol formaldehyde thermosetting resinous molding powder in an intermediate polymeric stage. One face of the board may comprise a sheet 13 of wood veneer, metal, colored or decorative paper or the like, or inert inorganic particles such as sand, finely divided silica, mica dust or the like which might also serve as a base for plaster, while the other face may comprise a layer of fire-proof material such as asbestos or other mineral wool fibers. Ribs may be formed in the faces of the board to provide more concealed jointing of outer sheets of material as indicated by numeral 28 in Figure 5. Further modification is possible by extending the face veneer 13 to establish an overlapping relation along meeting edges of the board covering so as to provide the appearance of continuity, as shown by numeral 29 in Figure 2.

It has also been found that it is possible to maintain an acceptable degree of flatness in a molded board of unbalanced construction by the adoption of further compensating unbalance in the construction, either alone or in combination with the concepts heretofore described for overcoming warpage. In accordance with these further means, warpage may be controlled or eliminated not only by adjusting the quantity of resin or moisture in one face or the other of the board, but also by the selection of a type of resin or additive used therewith to give one surface about the same permeability to water vapor or substantially the same coefficient of thermal expansion as the opposite surface of different composition. For example, urea formaldehyde resin may be used as a binder in one strata while phenol formaldehyde resin is used in another to vary the vapor permeability of the first so as to correspond with the characteristics achieved in the latter.

In the event that it is inconvenient or for other reasons, such as facing one side with a material such as metal or a plastic having an excessively different coefficient of expansion with heat and moisture to the opposite side, one cannot rely exclusively on unbalance in the composition or pressing conditions for equalizing the effects of absorbed moisture and temperature changes, as already mentioned warpage may be minimized by grooving the core of the board both in length and width. However, an improved result is obtained if warpage is allowed to take place but under conditions by which the molded product is formed with a predetermined reverse curvature and which is subsequently substantially eliminated by the natural warpage to provide a substantially flat end product. This procedure is especially adaptable to an operation whereby the cores are performed and the outer facings added as a subsequent operation by means of a single opening platen press. The employment of a multi-opening press for the cores and a single type opening press for integrating the facings onto the core yield a number of advantages. In the practice of this concept, mold forms are employed having a controlled curvature adapted to impart a contour to the molded product, which upon cooling or soon thereafter, because of unequal shrinkages or absorption of water vapor, warps or distorts the curved molded product so that it becomes substantially flat under normal atmospheric conditions. Minor adjustments are made by means already described to compensate for unforeseen factors. Usually the curved mold surfaces correspond to the reverse of the curvature which would have been formed in the molded product in the event that the board were molded flat.

It will be apparent from the description that a number of techniques are provided for minimizing or substantially eliminating factors which have heretofore caused undesirable buckling of warpage of molded products having an unbalanced construction, especially of products comprised chiefly of substantially dry chips or other fibrous materials.

It will be understood that any one or combinations of these concepts may be simultaneously practiced to produce consistently flat boards of unbalanced construction or boards having a desired contour and to provide boards having a decorative or other surface on one side and on the other side, a surface of a different composition, such as may be flame resistant or the like, the board nevertheless being and remaining substantially flat on exposure to normal atmospheric conditions.

It will be further understood that changes may be made in the details of construction and techniques for practicing the concepts of this invention without departing from the spirit of the invention, especially as defined in the following claims.

I claim:

1. The process of molding fibrous materials to produce composite boards which remain flat in varying ambient atmosphere comprising the steps of interfelting dry fibrous materials in combination with a thermosetting resinous binder in an intermediate stage of polymeric growth to form a mat, removing fibrous material from the surface portion of the mat in spaced parallel, lineal zones, superimposing a thin sheet of uniform thickness on the mat surface having the depleted lineal zones, and compressing the surfaced mat between heated, flat mold surfaces until the thermosetting resinous material is advanced to a set stage and the thin sheet and fibrous material are consolidated into a rigid molded board of uniform thickness and in which the portions corresponding to the depleted lineal zones beneath the thin sheet laminated to the mat constitute lineal zones of lesser density than the remainder of the board.

2. The process of molding fibrous materials to produce composite boards which remain flat in varying ambient atmosphere comprising the steps of interfelting dry fibrous materials in combination with a thermosetting resinous binder in an intermediate stage of polymeric growth to form a mat, removing fibrous material from the surface portion of the mat in spaced parallel lineal zones, and compressing the mat between heated, flat mold surfaces until the thermosetting resinous material is advanced to a set stage and the materials are consolidated into a rigid molded board of uniform thickness and in which the portions corresponding to the depleted lineal zones constitute lineal zones of less density than the remainder of the mat.

3. The method as claimed in claim 1 which includes the step of coating the mat with a layer of fire-proof material on the surface of the mat opposite that from which portoins of the fibrous material are removed to form the parallel spaced depleted lineal zones.

4. The process of molding fibrous materials to produce composite boards which remain flat in varying ambient atmosphere comprising the steps of interfelting fibrous material in combination with a thermosetting resinous binder in an intermediate stage of polymeric growth to form a mat, displacing fibrous material during interfelting from spaced lineal zones to provide corresponding furrows in the surface portion of the mat, and compressing the mat between heated, flat mold surfaces until the thermosetting resinous material is advanced to a set stage and the materials are consolidated into a rigid molded board of uniform thickness and in which the portions corresponding to the furrows constitute lineal zones of less density than the remainder of the mat.

5. The process of molding fibrous materials to produce composite boards which remain flat in varying ambient atmosphere comprising the steps of interfelting fibrous material in combination with a thermosetting resinous binder in an intermediate stage of polymeric growth to form a mat, displacing fibrous material during interfelting from spaced lineal zones to provide corresponding furrows of lesser fibrous material in cross section in the surface portion of the mat, superimposing a lamina of uniform thickness on the mat surface having the lineal zones of lesser fibers, and compressing the mat between heated, flat mold surfaces until the thermosetting resinous material is advanced to a set stage and the materials are consolidated into a rigid board of uniform thickness in which the portions corresponding to the lineal zones of lesser fibers beneath the lamina constitute lineal zones of lesser density than the remainder of the mat.

6. The process of molding fibrous material to produce composite boards which remain flat in varying ambient atmosphere comprising the steps of depositing fibrous material in combination with a thermosetting resinous binder in an intermediate stage of polymeric growth to form a mat having spaced lineal furrows in the surface portion thereof, and compressing the mat between heated, flat mold surfaces until the thermosetting resinous material is advanced to a set stage and the materials are consolidated into a rigid molded board of uniform thickness and in which the portions corresponding to the furrows constitute lineal zones of less density than the remainder of the board.

7. A flat board which remain substantially flat in varying ambient atmospheres consisting essentially of woody particles bound together with a thermosetting resinous binder and having therein a plurality of lineal zones of lower density compared with the density of the remainder of the board in which said lineal zones of lower density are concentrated adjacent a surface portion thereof, and a facing lamina bonded substantially throughout its area to the said surface portion of the board to form a composite structure.

8. A flat board as claimed in claim 7 in which the facing is pressed into the lineal zones without the density of the board adjacent such lineal zones exceeding the density of the remainder of the body portion of the board.

9. A flat board as claimed in claim 7 in which the facing is an isotropic fibrous material in the form of a wood veneer.

10. A flat board as claimed in claim 7 in which the facing on the surface opposed to the surface having therein a plurality of linear zones of lower density is formed of a fire resistant material.

11. The process of forming a flat composite board having a body of fibrous material and a thermosetting resinous binder and a facing on one of the surfaces of the body, which board remains substantially flat in various ambient atmospheres, comprising arranging the fibrous material and the resinous binder for the body portion in the form of a mat having a plurality of deep lineal zones of depleted material in a surface portion of the mat, applying a facing to one side of the mat, and compressing the mat between heated mold surfaces until the resinous binder is advanced to a set stage and all of the materials are consolidated into a rigid board of uniform thickness in which the body portion corresponding to the depleted zones is characterized by a lower density than in the remainder of the body portion of the board.

12. The process of forming a composite board having a facing bonded to a body portion of fibrous material and a thermosetting resinous binder which remains substantially flat in various ambient atmospheres, comprising arranging the fibrous material and binder in the form of a mat having a plurality of deep lineal zones depleted of material in the surface portion of the mat, applying the facing to one side of the mat, and compressing the mat between heated mold surfaces, one of which has a plurality of linear projections conforming with the lineal zones of depleted material, until the binder is advanced to a set stage and all of the material is consolidated into a rigid board of uniform thickness except for the portion corresponding to the lineal zones and in which the material surrounding the lineal zones has a density no greater than that of the remainder of the body portion of the board.

13. The method as claimed in claim 11 in which the facing is composed of a layer of fire resistant material applied to the surface of the mat opposite that of the lineal zones of depleted material.

References Cited in the file of this patent

UNITED STATES PATENTS

| | | | |
|---|---|---|---|
| 762,914 | Kron | June 21, | 1904 |
| 2,248,233 | Heritage | July 8, | 1941 |
| 2,438,339 | Jacobs | Mar. 23, | 1948 |
| 2,485,587 | Goss | Oct. 25, | 1949 |
| 2,564,055 | Elmendorf | Aug. 14, | 1951 |
| 2,581,652 | Goss | Jan. 8, | 1952 |
| 2,658,847 | MacDonald | Nov. 10, | 1953 |
| 2,683,710 | Briggs et al. | July 13, | 1954 |
| 2,693,619 | Goss | Nov. 9, | 1954 |